United States Patent Office 3,048,580
Patented Aug. 7, 1962

3,048,580
PREPARATION OF α-AMINOLACTAMS BY CATALYTIC HYDROGENATION OF α-NITROLACTAMS
Johannes H. Ottenheym, Sittard, and Pieter L. Kerkhoffs, Geleen, Netherlands, assignors to Stamicarbon N.V., Heerlen, Netherlands
No Drawing. Filed Sept. 10, 1959, Ser. No. 839,076
Claims priority, application Netherlands Oct. 15, 1958
9 Claims. (Cl. 260—239.3)

The present invention relates to the preparation of α-aminolactams.

It is known that the α-halogen atom in certain substituted caproic acid, such as α.chloro-ω.benzoylaminocaporic acid, α.bromo-α.benzoylaminocaproic acid and α.chloro-ω.actylaminocaproic acid, can be replayed by an amino group by treatment with ammonia (see U.S. Patents 2,519,038 and 2,561,574 and German Patent 945,926).

By this treatment, however, the corresponding α.aminolactams cannot easily be obtained from α.halogenolactams, because of the occurrence of ring breakage and the formation of other products. According to Adamson (J. Chem. Soc., 1943, p. 39) only a small yield of α-aminocaprolactam is obtained by the treating of lysinemethylester.

According to the present invention, it has now been found that a high yield of the difficulty accessible α-aminolactams can be obtained in a simple way by reducing α-nitrolactams with hydrogen.

The reduction of the α-nitrolactams can be carried out in different ways. Not only molecular hydrogen, but also atomic hydrogen formed, for instance, in a solution or suspension of the nitrolactam, can be used. Moreover, the reduction can be carried out with the aid of hydrogenation catalysts, of which Raney nickel, Raney cobalt, platinum, palladium and other metals or metal compounds are well-known examples.

According to a preferred way of carrying out the present invention, the nitrolactam, dispersed in an inert liquid, is reduced with hydrogen under increased pressure in the presence of a hydrogenation catalyst. It has been found that in this way a practically complete conversion can be obtained in a short time, as a rule in 15–30 minutes. The pressure may be varied within wide limits, and may be, for instance, 50, 80, 100, 150, 200 or 300 atm. or even higher, if so desired. The reaction temperature can also be varied and may be, for instance, 50, 70, 90, 100, 130, or 150° C. At higher temperatures, the risk of decomposition increases. When the nitrolactam is reduced in a dispersing medium, the temperature and the pressure may be chosen such that a liquid phase is present.

Any liquid inert under the reaction conditions may be used as the inert liquid. By preference, water and/or a water-miscible alcohol, such as ethanol or isopropanol, is used as dispersing medium. This use of water and/or lower aliphatic alcohol has the advantage that the α-aminolactam formed dissolves in the liquid medium. As a result, the catalyst can be separated off from the reaction product in a simple manner, for instance, by filtration. Moreover, the liquid phase remains homogeneous during the reduction, because water evolved in the reduction is taken up by the liquid medium.

From the alcoholic or aqueous solution, the aminolactam can be separated off by, for example, evaporating the solvent.

In the process according to the invention, the α-nitrolactams are converted into the corresponding α-aminolactams. Thus, for example, from α-nitrovalerolactam, α-aminovalerolactam is obtained while α-aminocaprolactam and α-amino-oenantholactam can be derived from α-nitrocaprolactam and α-nitro-oenantholactam, respectively. Additionally, α-nitrolactams containing a larger number of carbon atoms in the molecule, for instance, 11, 12, 13 or more, may be reduced to the corresponding α-aminolactams by the present invention.

The α-aminolactams obtained herein are of importance as starting products for the preparation of albumen foodstuffs such as lysine.

The invention is further illustrated, but not limited, by the following examples:

Example 1

In a cylindrical 0.5 liter autoclave, provided with a magnetic stirrer, 50 g. of α-nitrocaprolactam and 5 g. of palladium-carbon-catalyst are suspended in 250 ml. of 96% by weight ethanol.

The reduction is then carried out at a temperature of 80° C. and an initial hydrogen pressure of 160 atm. After 30 minutes, the reduction is completed and the autoclave cooled down to room temperature.

The catalyst is removed from the reaction mixture by filtration and by washing with ethanol. From the resulting solution, 40 g. of α-aminocaprolactam are obtained after the solvent has been evaporated; yield 98.8%.

Example 2

The same procedure as described in Example 1, is used except the reduction is carried out at a temperature of 140° C.

After 15 minutes, the reduction is completed and the autoclave is cooled.

40.1 g. of α-aminocaprolactam are obtained, which corresponds to a yield of 99%.

Example 3

In a 2 liter autoclave, provided with a magnetic stirrer, 237 g. of α-nitrocaprolactam and 4.5 g. of Raney nickel catalyst are suspended in 1.2 liters of 70% by weight aqueous isopropanol.

The reduction is carried out at a temperature of 97–100° C. and an initial hydrogen pressure of 150 atm.

After 20 minutes, the autoclave is cooled down to 30° C. and opened after the pressure has been relieved.

The catalyst is removed by filtration and by washing with water at 30° C. The wash water is added to the filtrate and from the resulting solution 189 g. of α-aminocaprolactam are obtained after the liquid has been evaporated. Yield 98.4%.

Example 4

In a 5 liter autoclave provided with a magnetic stirrer, 553 g. α-nitrocaprolactam and 12 g. of Raney nickel catalyst are suspended in 3 liters of water.

The reduction is carried out at a temperature of 105° C. and an initial hydrogen pressure of 130 atm.

After 20 minutes, the reduction is completed and the autoclave is cooled down to 50° C.

The reaction suspension is filtered while warm and the catalyst mass is washed with warm water.

From the aqueous solution 445 g. of α-aminocaprolactam are obtained, which corresponds to a yield of 99.3%.

Having described the invention, what is claimed as new is:

We claim:

1. A process for the preparation of an α-aminolactam containing up to 12 carbon atoms in the ring having the formula:

$$\begin{array}{c} NH_2 \\ | \\ CH\text{———}C=O \\ | \quad\quad\quad | \\ \quad\quad\quad NH \\ \text{———}(CH_2)_x\text{———} \end{array}$$

wherein $x$ is a whole number up to 10, which comprises contacting the corresponding α-nitrolactam with hydrogen at superatmospheric pressure and a temperature of up to 150° C., whereby said nitrolactam is reduced.

2. The process of claim 1 wherein said nitrolactam is dispersed in an inert solvent for the α-aminolactam.

3. The process of claim 2 wherein said pressure is between 50 and 300 atmospheres.

4. The process of claim 1 wherein said temperature is between 50° and 150° C.

5. The process of claim 1 wherein said reduction is carried out in the liquid phase.

6. The process of claim 1 wherein the nitrolactam is dispersed in an inert liquid and reduced with hydrogen in the presence of a metallic hydrogenation catalyst.

7. The process of claim 2 wherein said inert liquid is selected from the group consisting of water and a water-miscible lower aliphatic alcohol.

8. The process of claim 1 wherein said α-nitrolactam is α-nitrocaprolactam.

9. The process for preparing α-aminocaprolactam which comprises providing a dispersion of α-nitrocaprolactam in an inert solvent for aminocaprolactam selected from the group consisting of water and lower aliphatic alcohols; contacting the dispersed nitro compound with hydrogen at a temperature between 50° and 150° C. and a pressure between 50 and 300 atmospheres whereby said nitro compound is reduced; and then recovering the aminocaprolactam by evaporating said solvent.

References Cited in the file of this patent

UNITED STATES PATENTS

| | | |
|---|---|---|
| 2,825,739 | Allen et al. | Mar. 4, 1958 |
| 2,887,488 | Smiley | May 19, 1958 |

OTHER REFERENCES

Fieser: Organic Chemistry, 3rd ed. (1956), p. 231.

Fox and Foster: "Introduction to Protein Chemistry" (1957), p. 234.

Noller: "Chemistry of Organic Compounds," 2nd ed. (1958), p. 262.